(12) United States Patent
Kannan et al.

(10) Patent No.: US 8,553,555 B2
(45) Date of Patent: Oct. 8, 2013

(54) METHODS AND APPARATUS FOR AN EFFICIENT MULTICAST FILE DISTRIBUTION SYSTEM

(75) Inventors: Prasanna Kannan, San Diego, CA (US); An Mei Chen, San Diego, CA (US); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/355,657

(22) Filed: Jan. 16, 2009

(65) Prior Publication Data

US 2009/0185562 A1    Jul. 23, 2009

Related U.S. Application Data

(60) Provisional application No. 61/022,222, filed on Jan. 18, 2008.

(51) Int. Cl.
*H04L 1/00* (2006.01)
(52) U.S. Cl.
USPC .......................................................... 370/236
(58) Field of Classification Search
None
See application file for complete search history.

(56) References Cited

U.S. PATENT DOCUMENTS

| 5,862,335 | A  | * | 1/1999 | Welch et al. ................... | 709/224 |
| 6,850,962 | B1 | * | 2/2005 | Povolny et al. ............... | 709/203 |
| 2002/0038441 | A1 | * | 3/2002 | Eguchi et al. ................. | 714/748 |
| 2002/0075824 | A1 | * | 6/2002 | Willekes et al. .............. | 370/329 |
| 2005/0207415 | A1 | * | 9/2005 | Curcio et al. ................. | 370/390 |
| 2005/0223098 | A1 | * | 10/2005 | Rimac et al. ................... | 709/227 |
| 2005/0243777 | A1 | * | 11/2005 | Fong ............................. | 370/338 |

OTHER PUBLICATIONS

Luby, et al., "FLUTE—File Delivery over Unidirectional Transport", IETF RFC 3926, pp. 1-35, (Oct. 2004).

* cited by examiner

*Primary Examiner* — Yong Zhou
(74) *Attorney, Agent, or Firm* — The Marbury Law Group, PLLC (57) ABSTRACT

Methods and apparatus for an efficient multicast file distribution system. A method for transmitting a file over a distribution network includes encoding the file with a selected encoding scheme to form encoded packets, generating file delivery protocol (FDP) packets from the encoded packets, generating a file delivery control protocol (FDCP) packet that comprises control information associated with the FDP packets, and transmitting the FDCP packet and the FDP packets over the distribution network. A method for receiving a file over a distribution network includes receiving a FDCP packet and FDP packets, decoding the FDP packets based on the FDCP packet to generate encoded packets, and generating at least a portion of the file from the encoded packets.

39 Claims, 7 Drawing Sheets

METHODS AND APPARATUS FOR AN EFFICIENT MULTICAST FILE DISTRIBUTION SYSTEM

CLAIM OF PRIORITY UNDER 35 U.S.C. §119

The present Application for Patent claims priority to Provisional Application No. 61/022,222 entitled "METHOD AND APPARATUS FOR A EFFICIENT MULTICAST SYSTEM" filed Jan. 18, 2008, and assigned to the assignee hereof and hereby expressly incorporated by reference herein.

BACKGROUND

Data networks, such as wireless communication networks, have to trade off between services customized for a single terminal and services provided to a large number of terminals. For example, the distribution of content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and terminal power efficiency.

In current content delivery/distribution systems, foreground and background services are packed into a transmission frame and delivered to devices on a network. For example, a communication network may utilize Orthogonal Frequency Division Multiplexing (OFDM) to broadcast services from a network server to one or more mobile devices. For example, the foreground services comprise real time streaming video and/or audio that generally needs to be processed when received. The background services comprise non real-time advertisements, files or other data.

It has become increasingly important in current wireless distribution systems to be able to efficiently distribute non real-time data files to multiple devices. Conventional systems rely on an existing technology called Reliable Multicast Transport (RMT) that is specifically targeted for multicast file transfers in wired multicast networks. This technology utilizes relatively large packet headers relating to the routing of data packets and congestion control. However, packet routing and congestion control may not be problematic in a wireless distribution network and so RMT may be inefficient and not suitable for distributing non real-time files. Furthermore, RMT requires receiving devices to utilize complicated receiving logic so that the overhead associated with RMT can be processed.

Therefore, it would be desirable to have a system that operates to efficiently transfer files to multiple devices on a wireless distribution network, and also allows for simplified device/receiver implementations.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a multicast file distribution system (comprising methods and apparatus) is provided that operates to provide efficient file transfer to devices in a wireless distribution network. In an aspect, the multicast file distribution system operates to eliminate the need for large packet headers for packet routing and congestion control utilized in conventional RMT. The multicast file distribution system also operates to allow file data and meta-data information to be sent in different data channels (or flows) thereby providing for simplified device/receiver implementations.

The system is suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
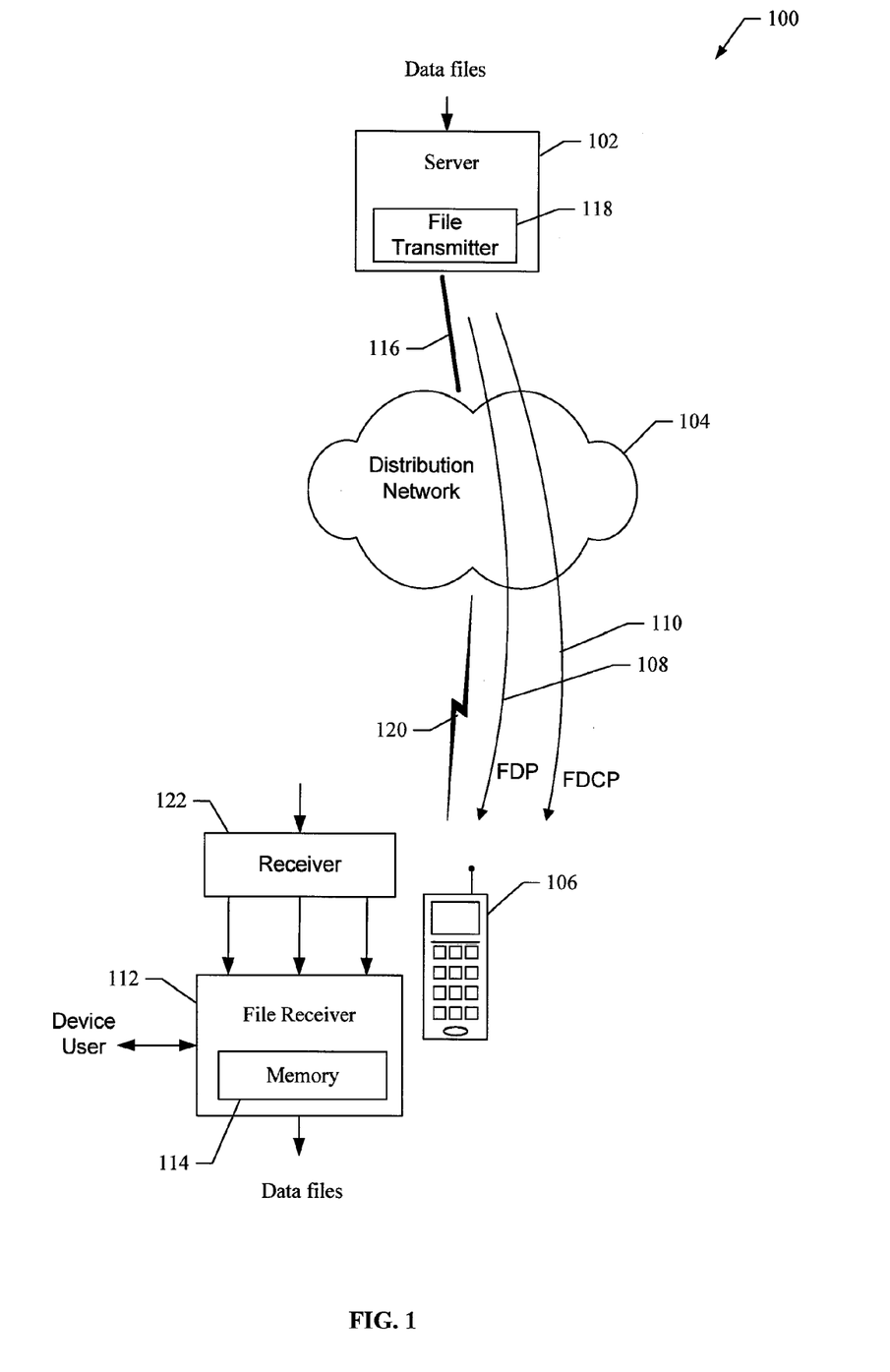
FIG. 1 shows a communication system that illustrates aspects of a multicast file distribution system.

FIG. 1 shows a communication system 100 that illustrates aspects of a multicast file distribution system. The communication system 100 comprises server 102, distribution network 104 and a device 106. In an aspect, the multicast file distribution system operates to deliver files to devices in communication with the distribution network 104. The files may contain arbitrary content or they may contain a set of media objects and associated metadata.

The server 102 operates to receive data files for distribution over the network 104. The server 102 operates to communicate with the network 104 using any type of communication link 116. The network 104 may be any type of wired and/or wireless network. In an aspect, the network 104 provides services to a local area in which the device 106 is operating. For example, the network 104 may operate to distribute data files to a local region or community, city, or county. It should be noted, that although only device 106 is shown, the system is suitable for use with any number and/or types of devices.

The server 102 comprises file transmitter 118 that operates to process data files and transmit them over the network 104. In an aspect, the file transmitter 118 operates to process each non real-time service into two flows. The first flow is used to deliver the file data according to a File Delivery Protocol (FDP) as illustrated at 108. The second flow is used to deliver control information related to the file delivery according to a File Delivery Control Protocol (FDCP) as illustrated at 110. FDP and FDCP are two closely-linked parts and both are utilized to complete the file delivery mechanism provided by the multicast file distribution system. As a result of utilizing the two flows, there is no need for a large amount of overhead to control routing or traffic congestion as used in conventional systems. Furthermore, the implementation of device receivers may be simplified.

The network 104 broadcasts files to devices over a transport layer using non real-time services. The network 104 may support multiple non real-time services. In various aspects, the network 104 may utilize any suitable type of wireless communication link 120 to communicate with the device 106.

The device 106 receives the FDP and FDCP flows at a receiver 122. The receiver 122 passes the flows to the file receiver 112. The file receiver 112 receives the files delivered on the non real-time services to which it subscribes and utilizes the FDCP flow to get the parameters required to decode and reassemble the file that is transported through the FDP flow. The received file may then be stored locally in a memory 114 for later access, as appropriate. For example, if the file contains a set of multimedia presentations, the file receiver 112 may extract the presentations contained in the file, and store them in the memory 114 so that they are available for later access by the device user.

Therefore, aspects of the multicast system operate to provide efficient file transfer to devices on a distribution network. It should be noted that the communication system 100 illustrates just one implementation and that other implementations are possible within the scope of the aspects.

Figure 2:
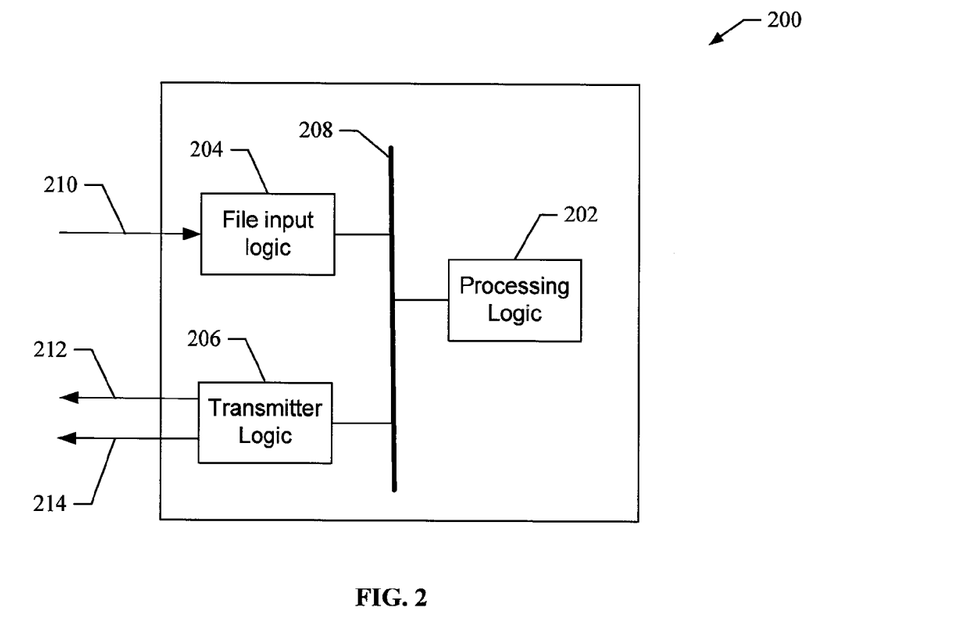
FIG. 2 shows an exemplary file transmitter for use in aspects of a multicast file distribution system.

FIG. 2 shows an exemplary file transmitter 200 for use in aspects of a multicast file distribution system. For example, the file transmitter 200 is suitable for use as the file transmitter 118 shown in FIG. 1. In an aspect, the file transmitter 200 comprises processing logic 202, file input logic 204, and transmitter logic 206 all coupled to a data bus 208. It should be noted that the file transmitter 200 is just one implementation and that other implementations are possible within the scope of the various aspects.

The transmitter logic 206 comprises hardware and/or hardware executing software that operate to allow the file transmitter 200 to communicate data or other information over a distribution network to remote devices or systems. For example, in an aspect, the transmitter logic 206 comprises broadcast logic that operates to broadcast data files and other information over a broadcast or multicast channel. The term "broadcast" is used herein to mean a broadcast, multicast or other transmission over a network that can be received by two or more devices. In an aspect, the transmitter logic 206 also comprises logic to transmit data files over a network using an FDP protocol 212 and control information using an FDCP protocol 214.

The file input logic 204 comprises hardware and/or software that operate to allow the file transmitter 200 receive data files for distribution over a distribution network. For example, the data files comprise any type of non real-time data and may be received from any entity, such as a content provider.

The processing logic 202 comprises at least one of a CPU, processor, gate array, hardware logic, memory elements, virtual machine, and/or hardware executing software. Thus, the processing logic 202 generally comprises logic to execute machine-readable instructions and to control one or more other functional elements of the file transmitter 200 using the data bus 208.

During operation, the processing logic 202 operates to provide a protocol stack that comprises a file delivery layer. The file delivery layer operates to encode data of the data files into FDP flows and encode control information associated with the data files into FDCP flows. The two flows are then transmitted over a distribution network by the transmitter logic 206. For example, the FDCP flow may comprise a single packet that comprises control information to allow packets of the FDP flow to be decoded.

In one implementation, the processing logic 202 controls the transmitter logic 206 to transmit the FDCP packet over the distribution network one or more times based on one or more factors. For example, the following factors may be considered to determine when and how often the FDCP packet is transmitted.

1. Available data rate—allows efficient use of network bandwidth.
2. System Performance—higher number of transmissions provide more robustness or reception guarantee.

Therefore, the file transmitter 200 operates in various aspects of the multicast system to perform one or more of the following functions.

1. Obtain data files for transmission over a wireless distribution network.
2. Encode the data into FDP flows.
3. Encode control information associated with the data into FDCP flows.
4. Transmit the FDP and FDCP flows to devices on the wireless distribution network.

In an aspect, the multicast file distribution system comprises one or more program instructions ("instructions") or sets of codes ("codes") stored or embodied on a machine-readable medium. The codes when executed by at least one processor, for instance, a processor at the processing logic 202, provides the functions described herein. For example, the codes may be loaded into the processing logic 202 from a machine-readable medium, such as a floppy disk, CDROM, memory card, FLASH memory device, RAM, ROM, or any other type of memory device or machine-readable medium that interfaces to the file transmitter 200. In another aspect, the codes may be downloaded into the file transmitter 200 from an external device or network resource. The codes, when executed, provide aspects of a multicast file distribution system as described herein.

Figure 3:
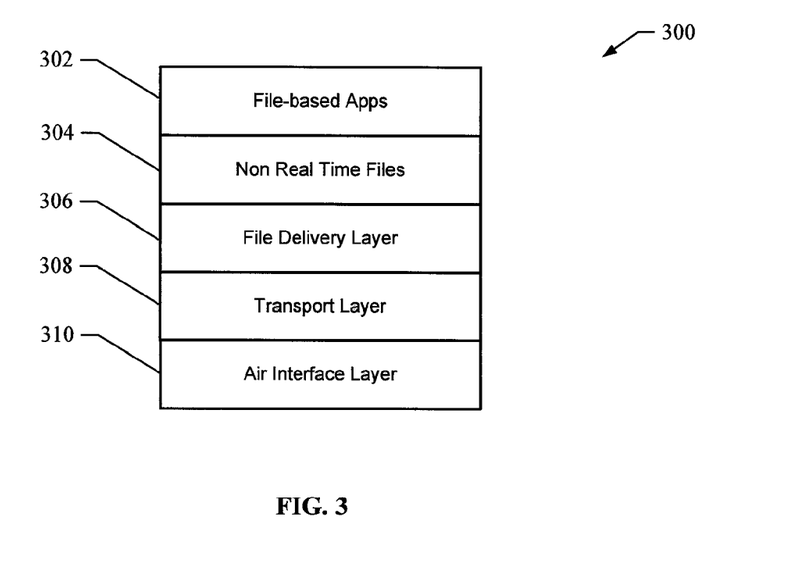
FIG. 3 shows an exemplary protocol stack for use in aspects of a multicast file distribution system.

FIG. 3 shows an exemplary protocol stack 300 for use in aspects of a multicast file distribution system. For example, the protocol stack 300 may be used by the file transmitter 200 and implemented by the processing logic 202.

The protocol stack 300 comprises file-based applications 302, non real-time services 304, file delivery layer 306, transport layer 308 and air interface layer 310.

The file delivery layer 306 operates to deliver files to devices. The file delivery layer 306 uses the services of the transport layer 308. Files are subject to message coding to ensure they are delivered efficiently and reliably from the network to devices. A more detailed description of the protocols and messages that belong to the file delivery layer 306 is provided below.

Figure 4:
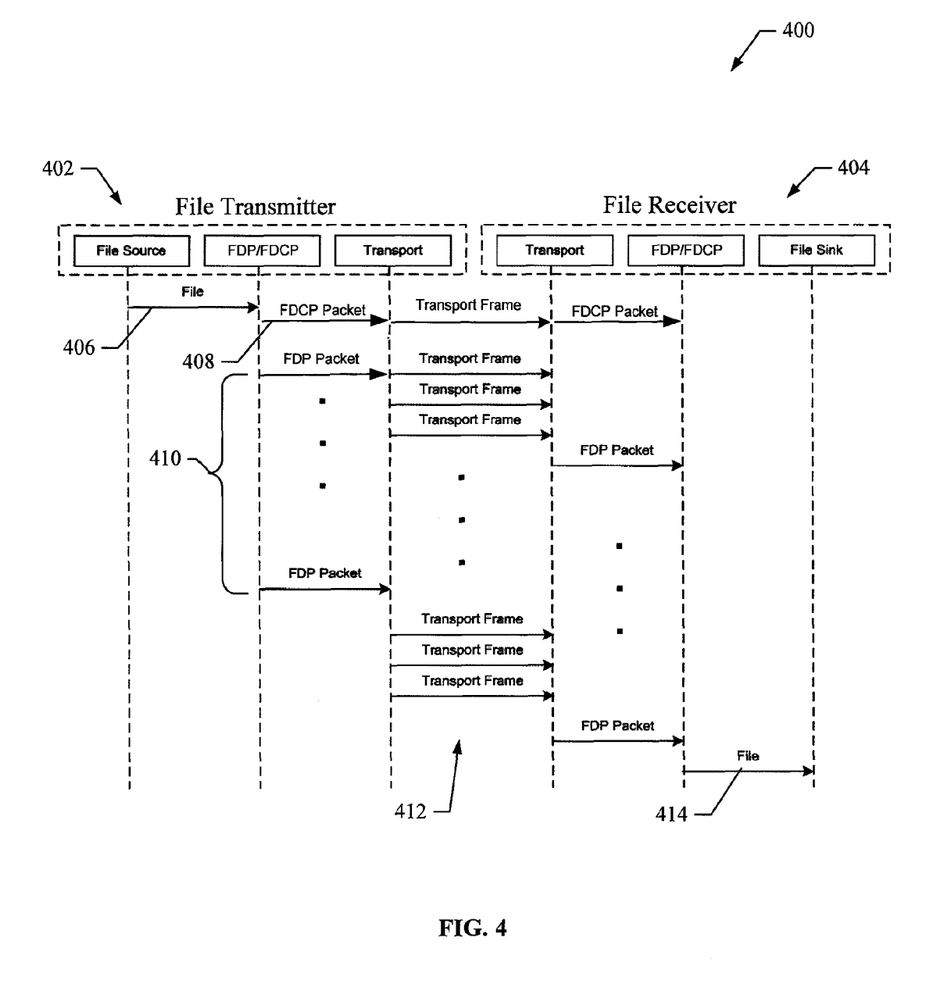
FIG. 4 shows exemplary operation of a file delivery layer for use in aspects of a multicast file distribution system.

FIG. 4 shows exemplary operation 400 of a file delivery layer for use in aspects of a multicast file distribution system. For the following description, it will be assumed that the operation 400 is performed by the file delivery layer 306 provided by the processing logic 202 of the file transmitter 200.

The main function of the file delivery layer 306 is to distribute a file efficiently and reliably to a large number of devices over a distribution network. As shown in FIG. 4, a file transmitter 402 first performs message encoding on a file 406 and then uses the FDP/FDCP to generate message coded packets that are distributed to devices (i.e., file receiver 404) on a distribution network As a part of message encoding, the file may be fragmented into file fragments. For example, the FDP/FDCP generates an FDCP packet 408 and a plurality of FDP packets 410. The FDCP packet 408 comprises control information associated with the FDP packets 410. The FDP packets 410 comprise the encoded file data. The FDCP 408 and FDP 410 packets are distributed over a distribution network using transport frames 412.

A file receiver 404 receives the FDCP packet 408 and uses control information contained to the FDCP packet 408 to perform message decoding after receiving a sufficient number of FDP packets 410. The decoded file 414 is then delivered to an application layer of the file receiver 404. As a part of message decoding, file reassembly will also be performed if the file is fragmented Message Coding Framework Message coding is a scalable method to combat packet loss while efficiently and reliably delivering files to devices in a mobile multicast environment. Message coding comprises message encoding performed by the file transmitter 402 and message decoding performed by the file receiver 404. The Message coding framework provides support for various file fragmentation algorithms and Forward Error Correction (FEC) schemes. The message coding framework utilizes a File Delivery Control Message (FDCM) of the FDCP for conveying message coding parameters and it utilizes a File Delivery Message (FDM) of the FDP for delivering the encoded packets. The format of FDCM and FDM are described in detail below.

In various aspects of the multicast file distribution system, FDM and FDCM are sent on different flows (or channels) over a distribution network. Each FDM and FDCM is sent as a single transport layer service packet using the service of transport layer 308. The transport layer 308 provides a packet interface to the file delivery layer 306. One method to convey flow identifiers for the FDP and FDCP flows is to convey the flow identifiers through flow records provided as part of the network's System Information (SI). One method to convey the broadcast time and duration of the FDM and FDCM is to convey this information through a contact window that is also part of the network's SI. In another implementation, the FDCM and FDM are sent over the same flow or same channel.

File Delivery Protocol

The File Delivery Protocol is responsible for the delivery of encoded packets. The FDP defines a FDM that is used to deliver the encoded packets. The FDMs are sent over the distribution network using the services of the transport layer 308. Each FDM is sent as a single transport layer service packet.

FDM Format

The following describes the format of an FDM used to convey the encoded packets in the message coding framework. The FDM comprises the parameters defined in Table 1 below.

TABLE 1

| Field Name | Field Type |
| --- | --- |
| FILE_TRANSPORT_ID | UINT(16) |
| FEC_PAYLOAD_ID | Variable |
| ENCODED_SYMBOL | Variable |

FILE_TRANSPORT_ID

A file transport identifier (FILE_TRANSPORT_ID) identifies the file whose file delivery attributes are described in the message. The file transmitter operates to assign FILE_TRANSPORT_IDs in such a way that these IDs are unique across files that have overlapping FDM delivery durations in a FDP flow or overlapping FDCM delivery durations in a FDCP flow.

FEC_PAYLOAD_ID

A forward error correction payload identifier (FEC_PAYLOAD_ID) identifies an ENCODED_SYMBOL. The format of this field is dependent on the specific FEC scheme utilized (see FEC_ENCODING_ID and FEC_INSTANCE_ID below).

ENCODED_SYMBOL

The encoded symbol (ENCODED_SYMBOL) field contains an encoded packet. The format of this field is dependent on the FEC scheme utilized.

File Delivery Control Protocol

The FDP specifies the format of encoded packets. However, it does not specify file delivery parameters that are common to a file delivery session. This information is delivered using messages delivered by the FDCP.

As shown in FIG. 1, FDCP messages are carried in a separate flow from that used to carry FDP Messages. The FDCP messages are sent over a distribution network using the services of the transport layer 308. The general format of an FDCP message is defined below.

General Format of FDCP Messages

In various aspects, all FDCP messages have a common format as illustrated in Table 2 below.

TABLE 2

| Field Name | Field Type |
| --- | --- |
| MESSAGE_TYPE | UINT(8) |
| Message Body | Variable |

The FDCP messages comprise a MESSAGE_TYPE followed by a Message Body. The format of the Message Body depends on the value of the MESSAGE_TYPE field.

MESSAGE_TYPE

The MESSAGE_TYPE field identifies the type of FDCP message. The defined values for MESSAGE_TYPE are specified in Table 3 below.

TABLE 3

| MESSAGE_TYPE | Value |
| --- | --- |
| FD_CONTROL_MESSAGE | 10 |

All other values are reserved.

Message Body

The Message Body comprises a variety of control information as illustrated in the particular example described below.

File Delivery Control Message—An Exemplary File Delivery Control Protocol Message The following is a description of FDCM—an exemplary FDCP Message. The File Delivery Control Message carries file delivery attributes of file delivery sessions in the message coding framework. In an aspect, the maximum size of a FDCM message does not exceed PMAX_NRT bytes, where PMAX_NRT, is a configurable system parameter. Each FDCM is sent as a single transport layer service packet using the service of transport layer 308. In an aspect, the FDCM is formatted as illustrated in Table 4 below.

TABLE 4

| Field Name | Field Type |
| --- | --- |
| MESSAGE_TYPE | UINT(8) |
| FILE_TRANSPORT_ID | UINT(16) |
| FILE_SIZE | UINT(32) |
| FEC_ENCODING_ID | UINT(8) |
| FEC_INSTANCE_ID | UINT(16) |
| FILE_TRANSMISSION_INFO | Variable |

MESSAGE_TYPE

The value of the MESSAGE_TYPE field shall be set to FD_CONTROL_MESSAGE (10).

FILE_TRANSPORT_ID

The file transport identifier (FILE_TRANSPORT_ID) identifies the file whose file delivery attributes are described in the message. The FILE_TRANSPORT_IDs are assigned in such a way that these IDs are unique across files that have overlapping FDM delivery durations in a FDP flow or overlapping FDCM delivery durations in a FDCP flow.

FILE_SIZE

The file size (FILE_SIZE) field gives the size of the file delivered in bytes.

FEC_ENCODING_ID

The FEC encoding identifier (FEC_ENCODING_ID) identifies a FEC scheme or a class of FEC schemes in the Message Coding framework.

FEC_INSTANCE_ID

The FEC instance identifier (FEC_INSTANCE_ID) is used to differentiate FEC schemes that share the same FEC_ENCODING_ID. This field is used in addition with the FEC_ENCODING_ID to specifically identify the FEC scheme used to encode the file being delivered. This field is present for FEC schemes that share the same FEC_ENCODING_ID with other FEC schemes.

FILE_TRANSMISSION_INFO

This field contains additional file delivery attributes such as the parameters for the FEC scheme used to encode the file being delivered. The format of this field will be dependent on the specific FEC scheme utilized.

Figure 5:
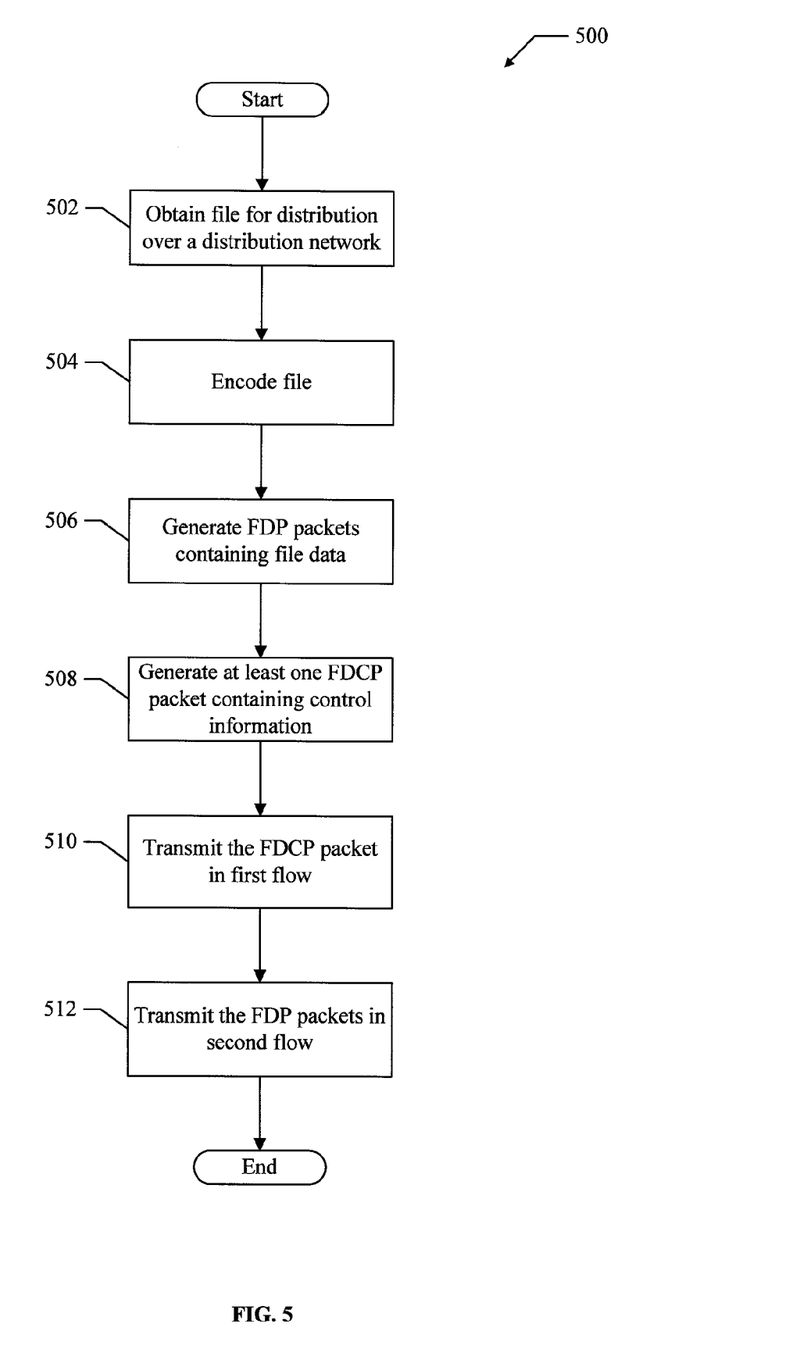
FIG. 5 shows an exemplary method for use in aspects of a multicast file distribution system.

FIG. 5 shows an exemplary method 500 for use in aspects of a multicast file distribution system. For clarity, the method 500 is described herein with reference to the file transmitter 200 shown in FIG. 2. For example, in an aspect, the processing logic 202 executes one or more sets of codes to control the file transmitter 400 to perform the operations described below. In an aspect, the processing logic 202 operates to provide a protocol stack as illustrate in FIG. 3 and various layers of the protocol stack operate to provide one or more of the operations described below.

At block 502, a file is obtained for distribution to devices on a distribution network. For example, the file may comprise data or other non real-time information and is received by the file input logic 204.

At block 504, the file is encoded for transmission. In an aspect, the processing logic 202 operates to encode the file using a selected FEC scheme.

At block 506, FDP packets are generated to comprise the encoded data. In an aspect, the processing logic 202 operates to process the encoded file packets to generate the FDP packets as described above.

At block 508, at least one FDCP packet is generated to comprise control information associated with the FDP packets. In an aspect, the processing logic 202 operates to generate the FDCP packet as described above. An FDCP packet comprises control information that allows a receiving device to decode received FDP packets and reconstruct the file. In one implementation only one FDCP packet is generated to describe the encoding of data for all the FDP packets associated with a particular file. It is also possible to generate multiple FDCP packets if the file is encoded in multiple ways (producing multiple sets of FDP packets) for distribution to different types of devices.

At block 510, the FDCP packet is transmitted over a distribution network in a first flow (or channel). For example, the transmitter logic 206 operates to transmit the FDCP packet over the distribution network in the first flow. In one implementation, the processing logic 202 controls the transmitter logic 206 to transmit the FDCP packet over the distribution network one or more times based on at least one factor selected from a set of factors that comprise available data rate and desired system performance.

At block 512, the FDP packets are transmitted over a distribution network in a second flow (or channel). For example, the transmitter logic 206 operates to transmit the FDP packets over the distribution network in the first flow. In another implementation, the FDP packets are transmitted using the same flow (or channel) as the FDCP packet.

Thus, the method 500 operates to provide an aspect of a multicast file distribution system. It should be noted that the method 500 represents just one implementation and that other implementations are possible within the scope of the aspects.

Figure 6:
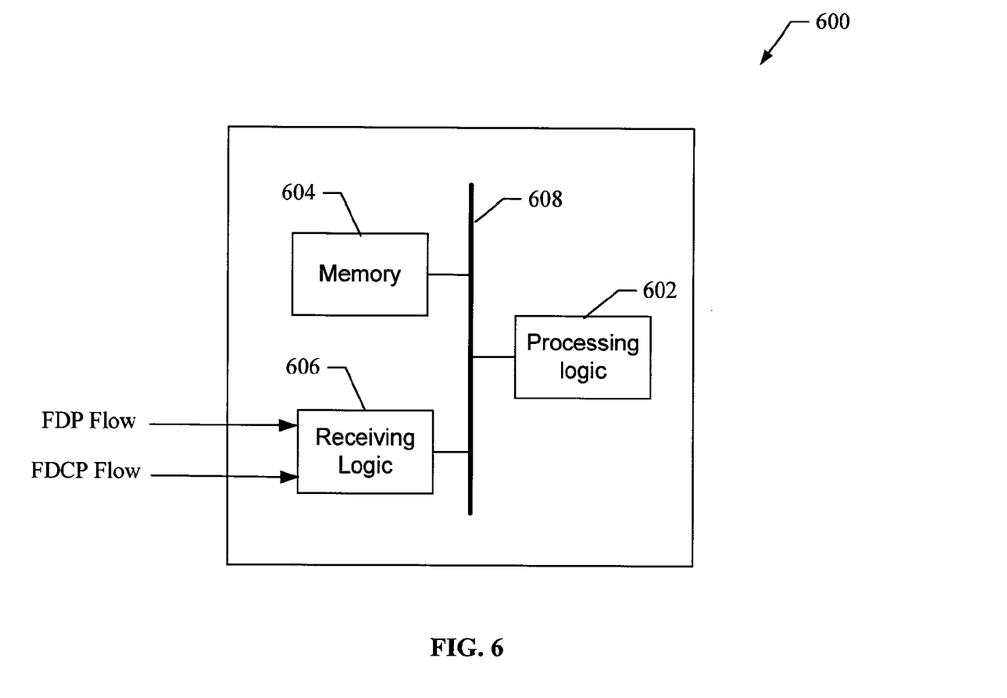
FIG. 6 shows exemplary file receiver for use in aspects of a multicast file distribution system.

FIG. 6 shows an exemplary file receiver 600 for use in aspects of a multicast file distribution system. For example, the file receiver 600 is suitable for use as the file receiver 112 shown in FIG. 1. The file receiver 600 comprises processing logic 602, memory 604, and receiving logic 606 all coupled to a data bus 608.

The receiving logic 606 comprises hardware and/or hardware executing software that operate to allow the file receiver 600 to receive an FDP flow and an FDCP flow from a distribution network. Information from the two flows is passed to the processing logic 602.

In an aspect, the memory 604 comprises any suitable memory device operable to allow information to be stored and retrieved for later processing.

In an aspect, the processing logic 602 comprises at least one of a CPU, processor, gate array, hardware logic, memory elements, virtual machine, software, and/or hardware executing software. Thus, the processing logic 602 generally comprises logic configured to execute machine-readable instructions and to control one or more other functional elements of the file receiving logic 600 using the data bus 608.

During operation, the receiving logic 606 receives FDP and FDCP flows and passes the received packets to the processing logic 602. The processing logic 602 implements at least a portion of a protocol stack as illustrated in FIG. 3. A file delivery layer utilizes the control information received in an FDCP packet to perform message decoding after receiving a sufficient number of message coded (FDP) packets. The decoded file is then delivered to an application layer. As part of the message decoding, file reassembly is also performed if the file is fragmented. In an aspect, any received packets, decoded packets, file fragments, or the entire file may be stored in the memory 604.

In an aspect, the multicast file distribution system comprises one or more program instructions ("instructions") or sets of codes ("codes") stored or embodied on a machine-readable medium. The codes when executed by at least one processor, for instance, a processor at the processing logic 602, provides the functions described herein. For example, the codes may be loaded into the processing logic 602 from a machine-readable medium, such as a floppy disk, CDROM, memory card, FLASH memory device, RAM, ROM, or any other type of memory device or machine-readable medium that interfaces to the file receiver 600. In another aspect, the codes may be downloaded into the file receiver 600 from an external device or network resource. The codes, when executed, provide aspects of a multicast file distribution system as described herein.

Figure 7:
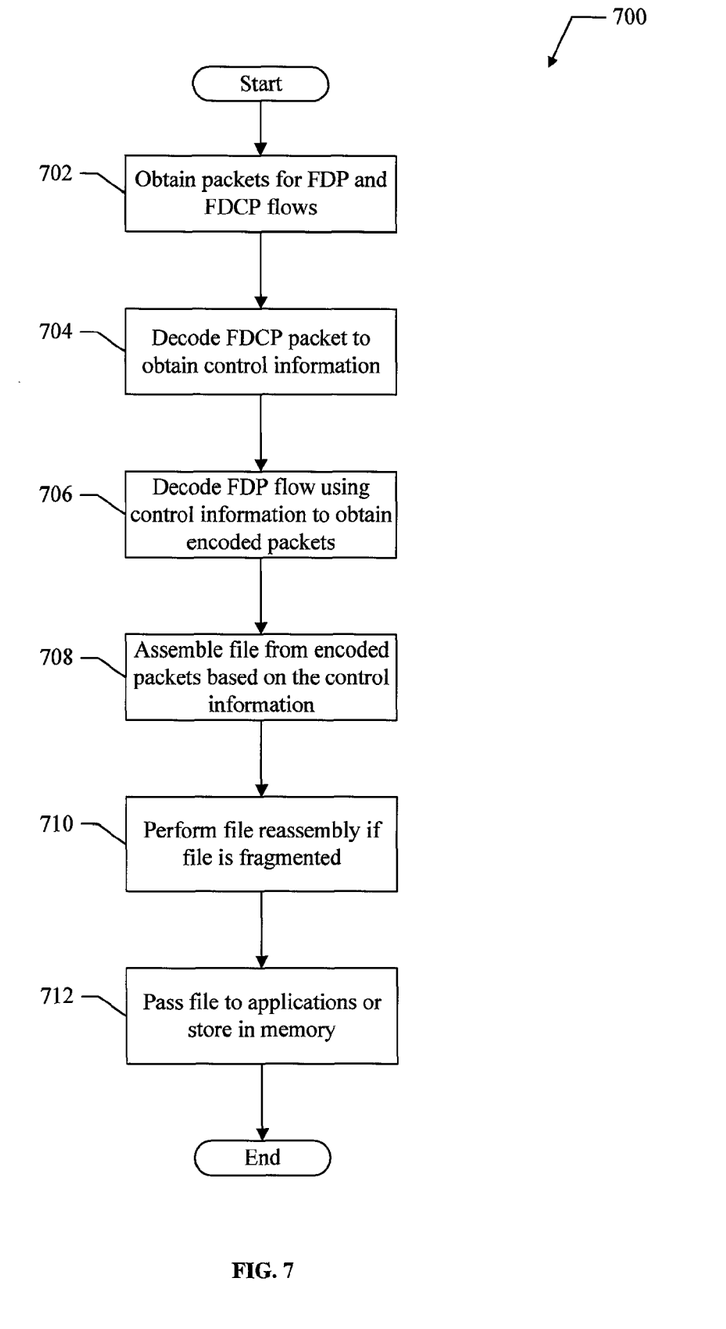
FIG. 7 shows an exemplary method for use in aspects of a multicast file distribution system.

FIG. 7 shows an exemplary method 700 for use in aspects of a multicast file distribution system. For clarity, the method 700 is described herein with reference to the file receiver 600 shown in FIG. 6. For example, in an aspect, the processing logic 602 executes one or more sets of codes to control the file receiver 600 to perform the operations described below. In an aspect, the processing logic 602 operates to provide a protocol stack as illustrate in FIG. 3 and various layers of the protocol stack operate to provide one or more of the operations described below.

At block 702, packets for FDP and FDCP flows are received. In an aspect, the packets are received by the receiving logic 606 and passed to the processing logic 602 for processing. In an aspect, the FDCP flow comprises a FDCP packet that comprises control information that can be used to decode packets associated with the FDP flow.

At block 704, a received FDCP packet is decoded to obtain control information associated with the FDP flow. For example, the received FDCP packet comprises control information as described above. In an aspect, the processing logic 602 operates to decode the FDCP packet.

At block 706, the FDP flow (comprising a plurality of FDP packets) is decoded using the control information to obtain encoded data packets. In an aspect, the processing logic 602 operates to utilize the control information to decode the FDP flow by performing message decoding after receiving a sufficient number of FDP packets.

At block 708, the file (or a file fragment) is assembled from the encoded packets and the control information. In an aspect, the processing logic 602 operates to assemble the file.

At block 710, file reassembly is performed if necessary. For example, received file fragments are reassembled into a complete data file. In an aspect, the processing logic 602 performs this operation.

At block 712, the file is passed to applications or stored in a memory. In an aspect, the processing logic 602 operates to pass the file to applications or store the file in the memory 604.

Thus, the method 700 operates to provide an aspect of a multicast file distribution system. It should be noted that the method 700 represents just one implementation and that other implementations are possible within the scope of the aspects.

Figure 8:
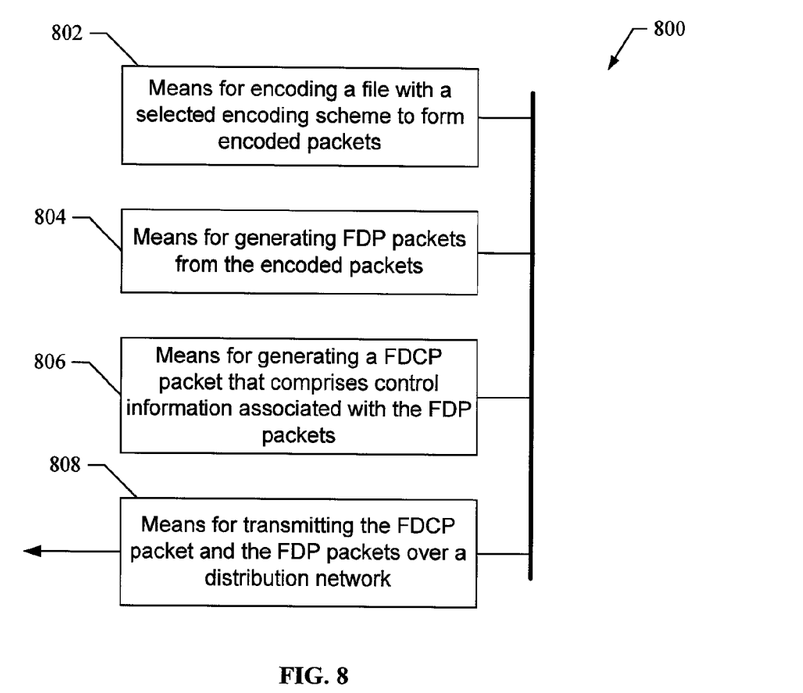
FIG. 8 shows an exemplary file transmitter for use in aspects of a multicast file distribution system.

FIG. 8 shows a file transmitter 800 for use in aspects of a multicast file distribution system. For example, the file transmitter 800 is suitable for use as the file transmitter 200 shown in FIG. 2. In an aspect, the file transmitter 800 is implemented by at least one processor comprising one or more modules configured to provide aspects of a multicast file distribution system as described herein. For example, each module comprises hardware and/or hardware executing software.

The file transmitter 800 comprises a first module comprising means (802) for encoding a file with a selected encoding scheme to form encoded packets, which in an aspect comprises the processing logic 202. The file transmitter 800 also comprises a second module comprising means (804) for generating FDP packets from the encoded packets, which in an aspect comprises the processing logic 202. The file transmitter 800 also comprises a third module comprising means (806) for generating a FDCP packet that comprises control information associated with the FDP packets, which in an aspect comprises the processing logic 202. The file transmitter 800 also comprises a fourth module comprising means (808) for transmitting the FDCP packet and the FDP packets over a distribution network, which in an aspect comprises the transmitter logic 206.

Figure 9:
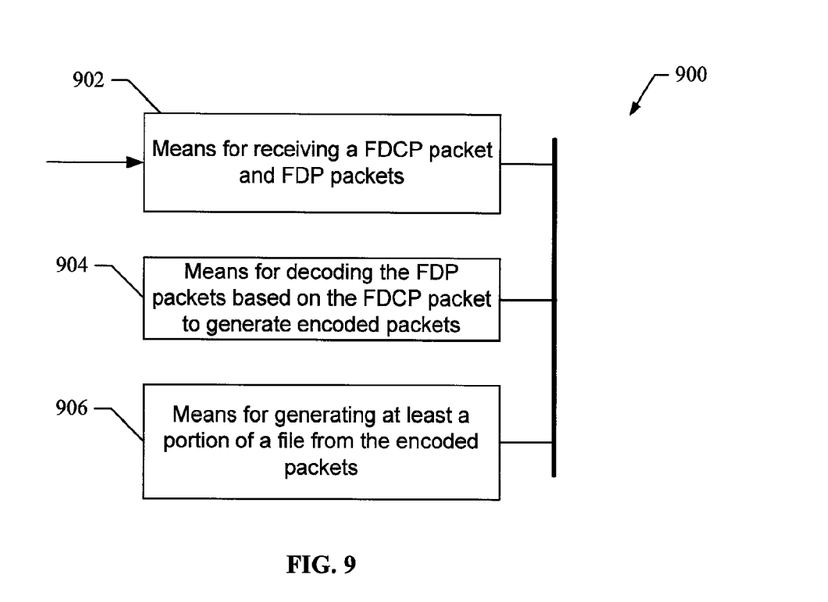
FIG. 9 shows an exemplary file receiver for use in aspects of a multicast file distribution system.

FIG. 9 shows a file receiver 900 for use in aspects of a multicast file distribution system. For example, the file receiver 900 is suitable for use as the file receiver 600 shown in FIG. 6. In an aspect, the file receiver 900 is implemented by at least one processor comprising one or more modules configured to provide aspects of a multicast file distribution system as described herein. For example, each module comprises hardware, and/or hardware executing software.

The file receiver 900 comprises a first module comprising means (902) for receiving a FDCP packet and FDP packets, which in an aspect is provided by the receiving logic 606. The file receiver 900 also comprises a second module comprising means (904) for decoding the FDP packets based on the FDCP packet to generate encoded packets, which in an aspect is provided by the processing logic 602. The file receiver 900 also comprises a third module comprising means (906) for generating at least a portion of a file from the encoded packets, which in an aspect comprises the processing logic 602.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a multicast file distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for transmitting a file over a wireless broadcast network, the method comprising:
encoding the file with a selected encoding scheme to form encoded packets;

generating file delivery protocol (FDP) packets from the encoded packets;

generating a file delivery control protocol (FDCP) packet that comprises encoded control information associated with the FDP packets, wherein the FDCP packet comprises a file identifier and an encoding identifier identifying one or more forward error correction schemes for decoding the FDP packets; and transmitting the FDCP packet in a first wireless communication channel and the FDP packets in a second wireless communication channel over the wireless broadcast network.

2. The method of claim 1, further comprising transmitting the FDCP packet over the wireless broadcast network a plurality of times based on at least one factor selected from a set of factors comprising available data rate and desired system performance.

3. The method of claim 1, wherein generating the FDP packets from the encoded packets further comprises generating each FDP packet to comprise a file identifier and at least one encoded packet.

4. The method of claim 1, wherein generating the FDCP packet that comprises encoded control information associated with the FDP packets comprises generating the FDCP packet that comprises encoded control information associated with the FDP packets and a file size identifier.

5. The method of claim 1, wherein generating the FDCP packet that comprises encoded control information associated with the FDP packets comprises generating the FDCP packet that comprises encoded control information associated with the FDP packets and parameters for the one or more forward error correction schemes for decoding the FDP packets.

6. An apparatus for transmitting a file over a wireless broadcast network, the apparatus comprising:
processing logic configure to:
encode the file with a selected encoding scheme to form encoded packets;
generate file delivery protocol (FDP) packets from the encoded packets; and
generate a file delivery control protocol (FDCP) packet that comprises encoded control information associated with the FDP, wherein the FDCP packet comprises a file identifier and an encoding identifier identifying one or more forward error correction schemes for decoding the FDP packets; and
transmitter logic configured to transmit the FDCP packet in a first wireless communication channel and the FDP packets in a second wireless communication channel over the wireless broadcast network.

7. The apparatus of claim 6, wherein said transmitter logic is configured to transmit the FDCP packet over the wireless broadcast network a plurality of times based on at least one factor selected from a set of factors comprising available data rate and desired system performance.

8. The apparatus of claim 6, wherein said processing logic is configured to generate each FDP packet to comprise a file identifier and at least one encoded packet.

9. The apparatus of claim 6, wherein said processing logic is configured to generate the FDCP packet to comprise a file size identifier.

10. An apparatus, comprising:
means for encoding a file with a selected encoding scheme to form encoded packets;
means for generating file delivery protocol (FDP) packets from the encoded packets;
means for generating a file delivery control protocol (FDCP) packet that comprises encoded control information associated with the FDP packets, wherein the FDCP packet comprises a file identifier and an encoding identifier identifying one or more forward error correction schemes for decoding the FDP packets; and
means for transmitting the FDCP packet in a first wireless communication channel and the FDP packets in a second wireless communication channel over a wireless broadcast network.

11. The apparatus of claim 10, further comprising means for transmitting the FDCP packet over the wireless broadcast network a plurality of times based on at least one factor selected from a set of factors comprising available data rate and desired system performance.

12. The apparatus of claim 10, wherein means for generating the FDP packets from the encoded packets further comprises means for generating each FDP packet to comprise a file identifier and at least one encoded packet.

13. The apparatus of claim 10, wherein means for generating the FDCP packet that comprises encoded control information associated with the FDP packets comprises means for generating the FDCP packet that comprises encoded control information associated with the FDP packets and a file size identifier.

14. The apparatus of claim 10, wherein means for generating the FDCP packet that comprises encoded control information associated with the FDP packets comprises means for generating the FDCP packet that comprises encoded control information associated with the FDP packets and parameters for the one or more forward error correction schemes for decoding the FDP packets.

15. A non-transitory computer-readable storage medium having stored thereon processor-executable instructions configured to cause a processor to perform operations comprising:
encoding a file with a selected encoding scheme to form encoded packets;
generating file delivery protocol (FDP) packets from the encoded packets;
generating a file delivery control protocol (FDCP) packet that comprises encoded control information associated with the FDP packets, wherein the FDCP packet comprises a file identifier and an encoding identifier identifying one or more forward error correction schemes for decoding the FDP packets; and
transmitting the FDCP packet in a first wireless communication channel and the FDP packets in a second wireless communication channel over a wireless broadcast network.

16. The non-transitory computer-readable storage medium of claim 15, wherein the stored processor-executable instructions are configured to cause a processor to perform operations further comprising transmitting the FDCP packet over the wireless broadcast network a plurality of times based on at least one factor selected from a set of factors comprising available data rate and desired system performance.

17. The non-transitory computer-readable storage medium of claim 15, wherein the stored processor-executable instructions are configured to cause a processor to perform operations such that generating the FDP packets from the encoded packets further comprises generating each FDP packet to comprise a file identifier and at least one encoded packet.

18. The non-transitory computer-readable storage medium of claim 15, wherein the stored processor-executable instructions are configured to cause a processor to perform operations such that generating the FDCP packet that comprises encoded control information associated with the FDP packets comprises generating the FDCP packet that comprises encoded control information associated with the FDP packets and a file size identifier.

19. The non-transitory computer-readable storage medium of claim 15, wherein the stored processor-executable instructions are configured to cause a processor to perform operations such that generating the FDCP packet that comprises encoded control information associated with the FDP packets comprises generating the FDCP packet that comprises encoded control information associated with the FDP packets and parameters for the one or more forward error correction schemes for decoding the FDP packets.

20. A device, comprising:
a transmitter configured to interface with a wireless broadcast network; and
a processor coupled to the transmitter, the processor configured with processor-executable instructions to perform operations comprising:
encoding a file with a selected encoding scheme to form encoded packets;
generating file delivery protocol (FDP) packets from the encoded packets; and
generating a file delivery control protocol (FDCP) packet that comprises encoded control information associated with the FDP packets, wherein the FDCP packet comprises a file identifier and an encoding identifier identifying one or more forward error correction schemes for decoding the FDP packets; and
transmitting, via the transmitter, the FDCP packet in a first wireless communication channel and the FDP packets in a second wireless communication channel over the wireless broadcast network.

21. The device of claim 20, wherein the processor is configured with processor-executable instructions to perform operations further comprising transmitting the FDCP packet over the wireless broadcast network a plurality of times based on at least one factor selected from a set of factors comprising available data rate and desired system performance.

22. The device of claim 20, wherein the processor is configured with processor-executable instructions to perform operations such that generating the FDP packets from the encoded packets further comprises generating each FDP packet to comprise a file identifier and at least one encoded packet.

23. The device of claim 20, wherein the processor is configured with processor-executable instructions to perform operations such that generating the FDCP packet that comprises encoded control information associated with the FDP packets comprises generating the FDCP packet that comprises encoded control information associated with the FDP packets and a file size identifier.

24. The device of claim 20, wherein the processor is configured with processor-executable instructions to perform operations such that generating the FDCP packet that comprises encoded control information associated with the FDP packets comprises generating the FDCP packet that comprises encoded control information associated with the FDP packets and parameters for the one or more forward error correction schemes for decoding the FDP packets.

25. A method for receiving a file over a wireless broadcast network, the method comprising:
receiving a file delivery control protocol (FDCP) packet on a first wireless communication channel and file delivery protocol (FDP) packets on a second wireless communication channel of the wireless broadcast network, wherein the FDP packets include encoded packets associated with the file and the FDCP packet includes encoded control information associated with the FDP packets, the FDCP packet comprising a file identifier and an encoding identifier identifying one or more forward error correction schemes for decoding the FDP packets;
decoding the FDP packets based on the FDCP packet to generate the encoded packets; and
generating at least a portion of the file from the encoded packets.

26. The method of claim 25, wherein each FDP packet comprises a file identifier and at least one encoded packet.

27. The method of claim 25, wherein the FDCP packet comprises a file size identifier.

28. An apparatus for receiving a file over a wireless broadcast network, the apparatus comprising:
receiving logic configured to receive a file delivery control protocol (FDCP) packet on a first wireless communication channel and file delivery protocol (FDP) packets on a second wireless communication channel of the wireless broadcast network, wherein the FDP packets include encoded packets associated with the file and the FDCP packet includes encoded control information associated with the FDP packets, the FDCP packet comprising a file identifier and an encoding identifier identifying one or more forward error correction schemes for decoding the FDP packets; and
processing logic configured to decode the FDP packets based on the FDCP packet to generate the encoded packets, and generate at least a portion of the file from the encoded packets.

29. The apparatus of claim 28, wherein each FDP packet comprises a file identifier and at least one encoded packet.

30. The apparatus of claim 28, wherein the FDCP packet comprises a file size identifier.

31. An apparatus, comprising:
means for receiving a file delivery control protocol (FDCP) packet on a first wireless communication channel and file delivery protocol (FDP) packets on a second wireless communication channel of a wireless broadcast network, wherein the FDP packets include encoded packets associated with a file and the FDCP packet includes encoded control information associated with the FDP packets, the FDCP packet comprising a file identifier and an encoding identifier identifying one or more forward error correction schemes for decoding the FDP packets;
means for decoding the FDP packets based on the FDCP packet to generate the encoded packets; and
means for generating at least a portion of the file from the encoded packets.

32. The apparatus of claim 31, wherein each FDP packet comprises a file identifier and at least one encoded packet.

33. The apparatus of claim 31, wherein the FDCP packet comprises a file size identifier.

34. A non-transitory computer-readable storage medium having stored thereon processor-executable instructions configured to cause a processor to perform operations comprising:
receiving a file delivery control protocol (FDCP) packet on a first wireless communication channel and file delivery protocol (FDP) packets on a second wireless communication channel of a wireless broadcast network, wherein the FDP packets include encoded packets associated with a file and the FDCP packet includes encoded control information associated with the FDP packets, the FDCP packet comprising a file identifier and an encoding identifier identifying one or more forward error correction schemes for decoding the FDP packets;

decoding the FDP packets based on the FDCP packet to generate the encoded packets; and generating at least a portion of the file from the encoded packets.

35. The non-transitory computer-readable storage medium of claim 34, wherein the stored processor-executable instructions are configured to cause a processor to perform operations such that each FDP packet comprises a file identifier and at least one encoded packet.

36. The non-transitory computer-readable storage medium of claim 34, wherein the stored processor-executable instructions are configured to cause a processor to perform operations such that the FDCP packet comprises a file size identifier.

37. A device, comprising:

a receiver configured to interface with a wireless broadcast network; and a processor coupled to the receiver, the processor configured with processor-executable instructions to perform operations comprising:

receiving, via the receiver, a file delivery control protocol (FDCP) packet on a first wireless communication channel and file delivery protocol (FDP) packets on a second wireless communication channel of the wireless broadcast network, wherein the FDP packets include encoded packets associated with a file and the FDCP packet includes encoded control information associated with the FDP packets, the FDCP packet comprising a file identifier and an encoding identifier identifying one or more forward error correction schemes for decoding the FDP packets; and decoding the FDP packets based on the FDCP packet to generate the encoded packets; and generating at least a portion of the file from the encoded packets.

38. The device of claim 37, wherein the processor is configured with processor-executable instructions to perform operations such that each FDP packet comprises a file identifier and at least one encoded packet.

39. The device of claim 37, wherein the processor is configured with processor-executable instructions to perform operations such that the FDCP packet comprises a file size identifier.

* * * * *